(12) United States Patent  
Craine

(10) Patent No.: US 8,161,545 B2  
(45) Date of Patent: Apr. 17, 2012

(54) KEYBOARD WITH PROGRAMMABLE USERNAME AND PASSWORD KEYS AND SYSTEM

(76) Inventor: Dean A. Craine, Bellevue, WA (US)

( * ) Notice: Subject to any disclaimer, the term of this patent is extended or adjusted under 35 U.S.C. 154(b) by 703 days.

(21) Appl. No.: 12/362,265

(22) Filed: Jan. 29, 2009

(65) Prior Publication Data

US 2009/0193518 A1     Jul. 30, 2009

Related U.S. Application Data

(60) Provisional application No. 61/062,946, filed on Jan. 29, 2008.

(51) Int. Cl.
  *G06F 21/00* (2006.01)
  *G06F 7/04* (2006.01)
  *H04L 9/00* (2006.01)
  *H04L 9/32* (2006.01)

(52) U.S. Cl. ............... 726/18; 726/16; 726/17; 726/27; 726/28; 726/29; 713/182; 713/183; 713/184; 713/185; 713/186

(58) Field of Classification Search .................... 726/18  
See application file for complete search history.

(56) References Cited

U.S. PATENT DOCUMENTS

2008/0307236 A1 * 12/2008 Lu et al. .................... 713/184

* cited by examiner

*Primary Examiner* — Longbit Chai

(57) ABSTRACT

A computer input system and method that includes a plurality of username keys and a plurality of password keys that can be selectively programmed by the user. When the user is required to enter a username or password to use the computer, a software program, a file, a network or a website, the user moves the cursor on the display to the proper field and touches one of the pre-programmed username and password keys to automatically input the username and password. The system includes a software program that creates a username and password recording page in which the user enters different usernames and passwords and then assigns them to different username keys and password keys on the keyboard. The system also creates a protected asset menu page that allows the user to list different protected assets and the combination of username and password keys needed to use, open or access them. The keyboard may include a security feature that prevents unauthorized use of the keyboard.

6 Claims, 4 Drawing Sheets

User Name and Password Recording Page

| ACCOUNT | USER NAME | PASSWORD | LAST CHANGED |
|---|---|---|---|
| ABC Bank Website | 1 | 1 | 1/1/2007 |
| DEF Bank Website | 1 | 2 | 5/1/2006 |
| Health Care Provider Website | 2 | 2 | 9/1/2005 |
| Music Website | 3 | 1 | 12/2/2004 |
| Book Store Website | 4 | 3 | 4/30/2005 |
| Email Account #1 | 2 | 4 | 3/31/2004 |
| Email Account #2 | 5 | 5 | 2/28/2006 |
| Network #1 | 4 | 3 | 9/30/2007 |
| Network #2 | 2 | 4 | 3/14/2006 |
| This Computer | 3 | 5 | 6/10/2006 |

KEYBOARD WITH PROGRAMMABLE USERNAME AND PASSWORD KEYS AND SYSTEM

This is a utility patent application which claims benefit of U.S. Provisional Application No. 61/062,946, filed on Jan. 29, 2008.

BACKGROUND OF THE INVENTION

1. Field of the Invention

This invention pertains to computer security measures for logging onto a computer or website using pre-assigned usernames and passwords.

2. Description of the Related Art

Usernames and passwords are commonly used for logging onto various computers, networks and websites. Keeping track of the usernames and passwords and changing them on a regular basis and then recalling the new usernames and passwords are very difficult for most computer users. Because usernames and passwords are so commonly used, correctly typing them each time to use a computer, to open a program, to open a file, to connect to a network or to visit a website is very time consuming and annoying.

Because most individuals use their memories to recall usernames and passwords, the usernames and password chosen are usually relatively simple and easy to memorize. However, many websites are mandating users choose more complex passwords for security purposes. Complex passwords may include use of a capital letter, a required amount of letters/numbers, distinct characters, etc. These complex passwords can be difficult to recall.

What is needed is a system that allows the user to easily recall both simple and more complex usernames and passwords and automatically and accurately type them into the computer when needed.

SUMMARY OF THE INVENTION

These objects are met by the system disclosed herein that includes a computer input device, such as a keyboard, that has a plurality of programmable username keys and a plurality of password keys that can be selectively assigned to different usernames and different passwords, respectively. When a user is required to input a username and password to use a computer, to use a network, to open a software program or to visit a website, the user simply moves the cursor on the display to the proper username and password entry box and touches the proper username key and password key, respectively. The username and password assigned to the username keys and password keys are automatically inputted into the username and password entry boxes, respectively.

The system includes a username and password recording software program that presents a username and password recording page where a plurality of different usernames and passwords and entered. Each username is assigned to a username key and each password is assigned to a password key on the keyboard by the software program. The software program also presents a protected asset menu page in which the names of specific protected assets used or accessed by the user are listed. Protected assets may be any hardware, network, software program, file or website or website account that requires the input of a username and a password. The user then assigns to each protected asset the username key and password key associated with the username and password needed to open or access the protected asset. The protected asset menu page may include a date column that informs the user when the username and password for each protected asset was last changed.

In one embodiment, the username keys are grouped together on one side of the keyboard and the password keys are grouped together on the opposite side of the keyboard. Located adjacent to each key is an optional label with asset identifying indicia printed thereon that reminds the user that a particular protected asset has been assigned to the adjacent username key or password key.

Because the protected asset may be listed adjacent to the username key and password key, a means for activating or deactivating the username keys and password keys is also provided.

DESCRIPTION OF THE DRAWINGS

FIG. 4 is an illustration of a table created by the system on the display that is shown to the user that allows the user to create different account entities and assign different combinations of username keys and password keys to each account entity, and records the date the username and passwords were last changed.

DESCRIPTION OF THE PREFERRED EMBODIMENT

Figure 1:
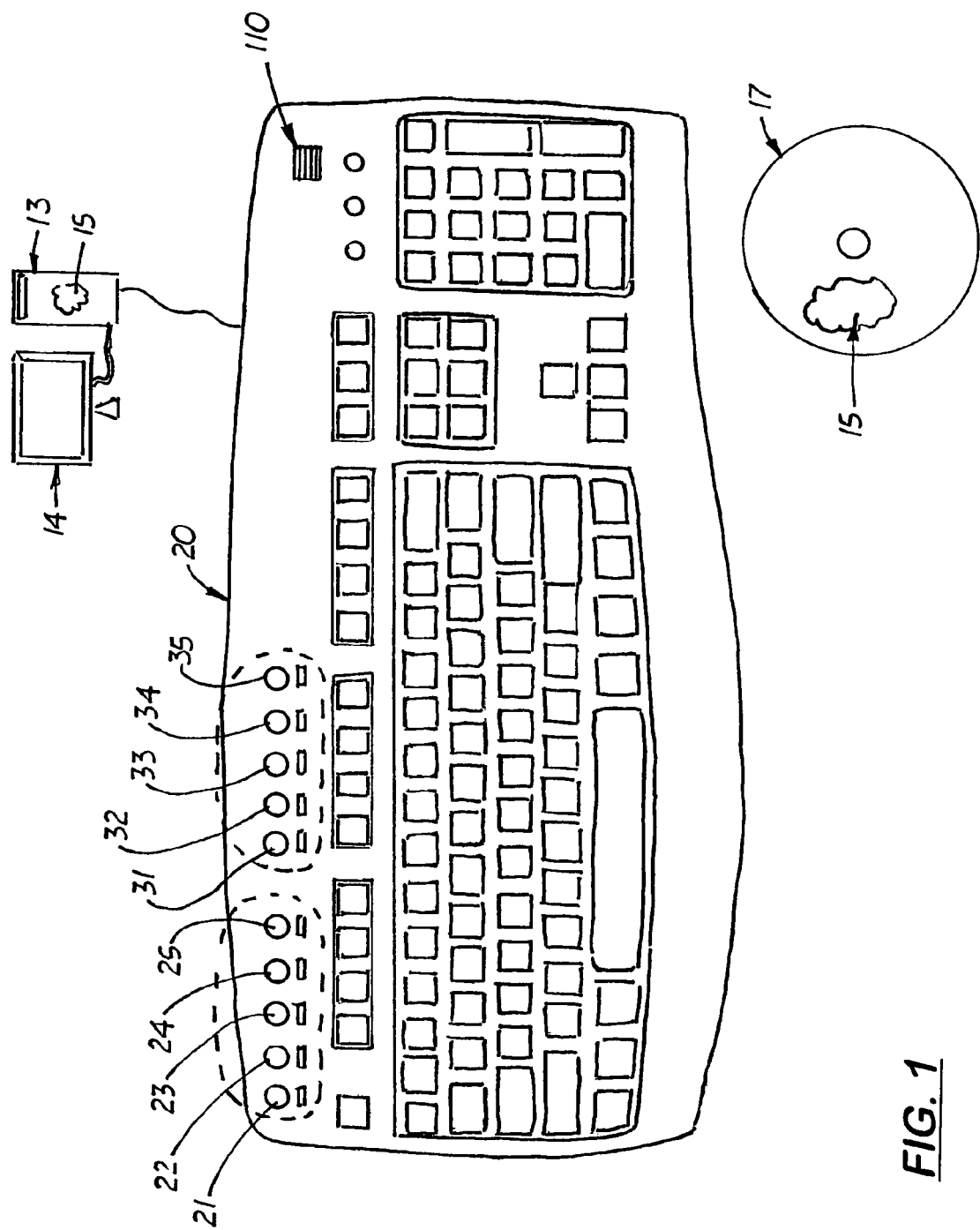
FIG. 1 is a top plan view of a computer keyboard with a plurality of username keys and a plurality of password keys that can be selectively programmed by the user.

Referring to FIGS. 1-4, there is shown a system 10 that allows a user to create and record different usernames 45 and passwords 55 for using the computer denoted 13 to open or access various networks, various software programs, files, and websites.

The system 10 includes a computer input device, represented as a keyboard 20 that has a plurality of programmable username keys 21-25 and a plurality of password keys 31-35. A software program 15 is used to assign different usernames 45 and passwords 55 to the username keys 21-25 and the password keys 31-35, respectively.

Figure 3:
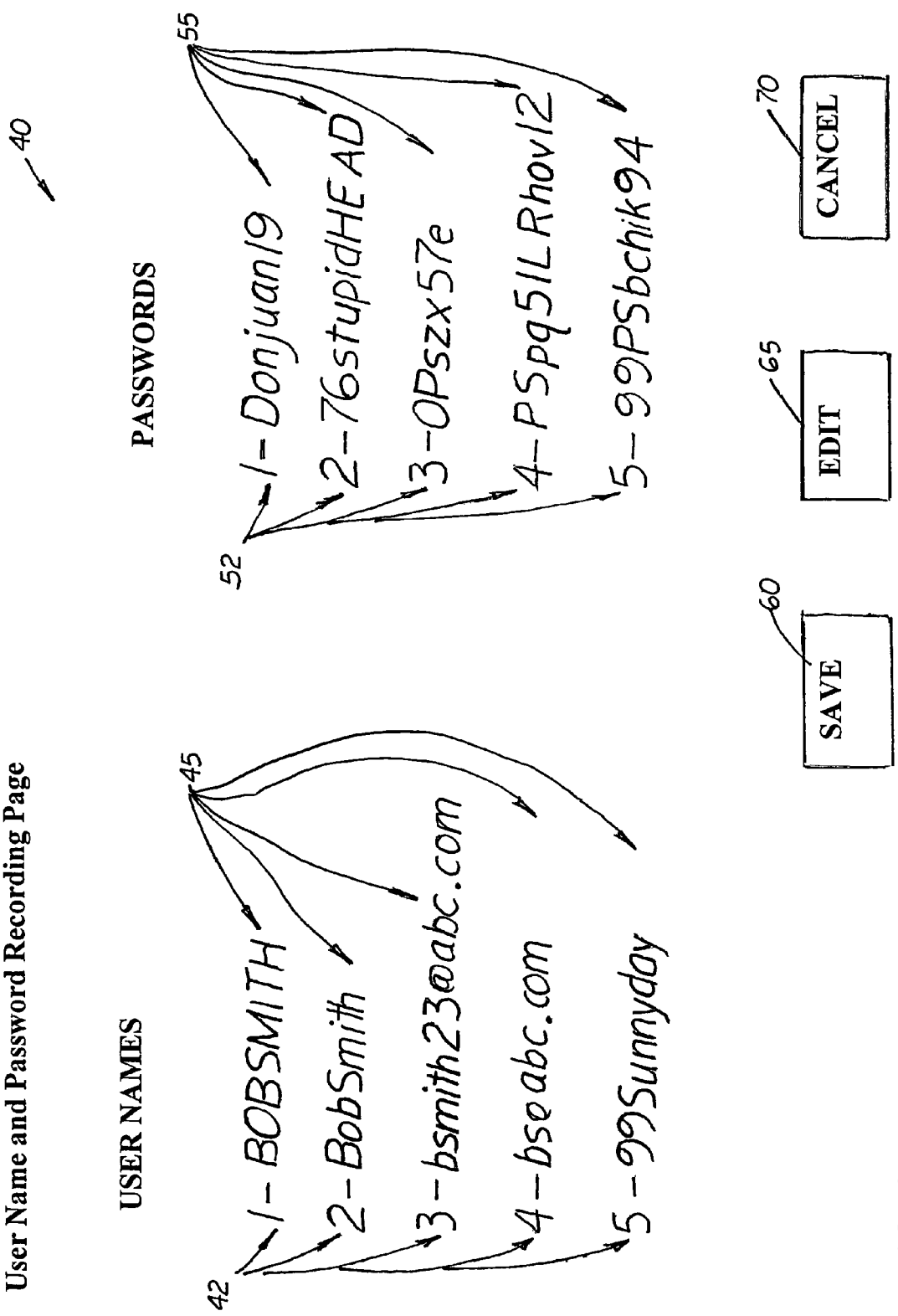
FIG. 3 is an illustration of a table created by the system on the display that is shown to the user that allows the user to assign different usernames and passwords to the username keys and password keys, respectively.

During setup, the software program 15 is loaded into the computer 13 linked to the keyboard 20. The software program 15 presents on the computer's display 14 a User Name and Password Recording page 40, as shown in FIG. 3. The Recording Page 40 presents the assigned Letters or Numbers 1-5 of the programmable username keys 21-25 and the assigned Letters or Numbers 1-5 of the programmable password keys 31-35, respectively. On the Recording Page 40, blank entry lines are provided in which specific usernames 45 and passwords 55 to be entered. When finished, the SAVE button 60 is pressed which automatically assigns the inputted username 45 and password 55 to the username key 21-25 number and password key 31-35 number. On the Recording Page 40, an Edit button 65 and Cancel button 70 are provided that allows the user to edit or change the username 45 and password 55 assigned to different username keys 21-25 and password keys 31-35, respectively.

When the user is required to enter a username 45 or password 55 to use the computer 13, to use a password protected program, to access a network, to open a software program, or to access a website, the user moves the cursor on the display to the username or password input field and touches one of the pre-programmed username keys 21-25 and password keys 31-35, respectively, on the keyboard 20 which automatically inputs the username 45 and password 55 associated with the keys 21-25 and 31-35, as recording in the Recording Page 40.

The software program 15 is also designed to create a protected asset menu table 80 shown in FIG. 4 includes an Account column 85 that allows the user to create a list of different protected assets and then assign an username key 21-25 in the User Name column 90 and a password key 31-35 in the Password column 95 recited in the Recording Page 40. On the menu table 80, a Last Change date column 100 is provided that informs the user when the username keys 21-25 and password keys 31-35 associated with the username 45 and passwords 55 were changed for the asset entity. The new table may be stored into the computer hard drive so that the user may easily select or change the username 45 or password 55 at any time, or it may be stored only on the portable storage device.

Figure 2:
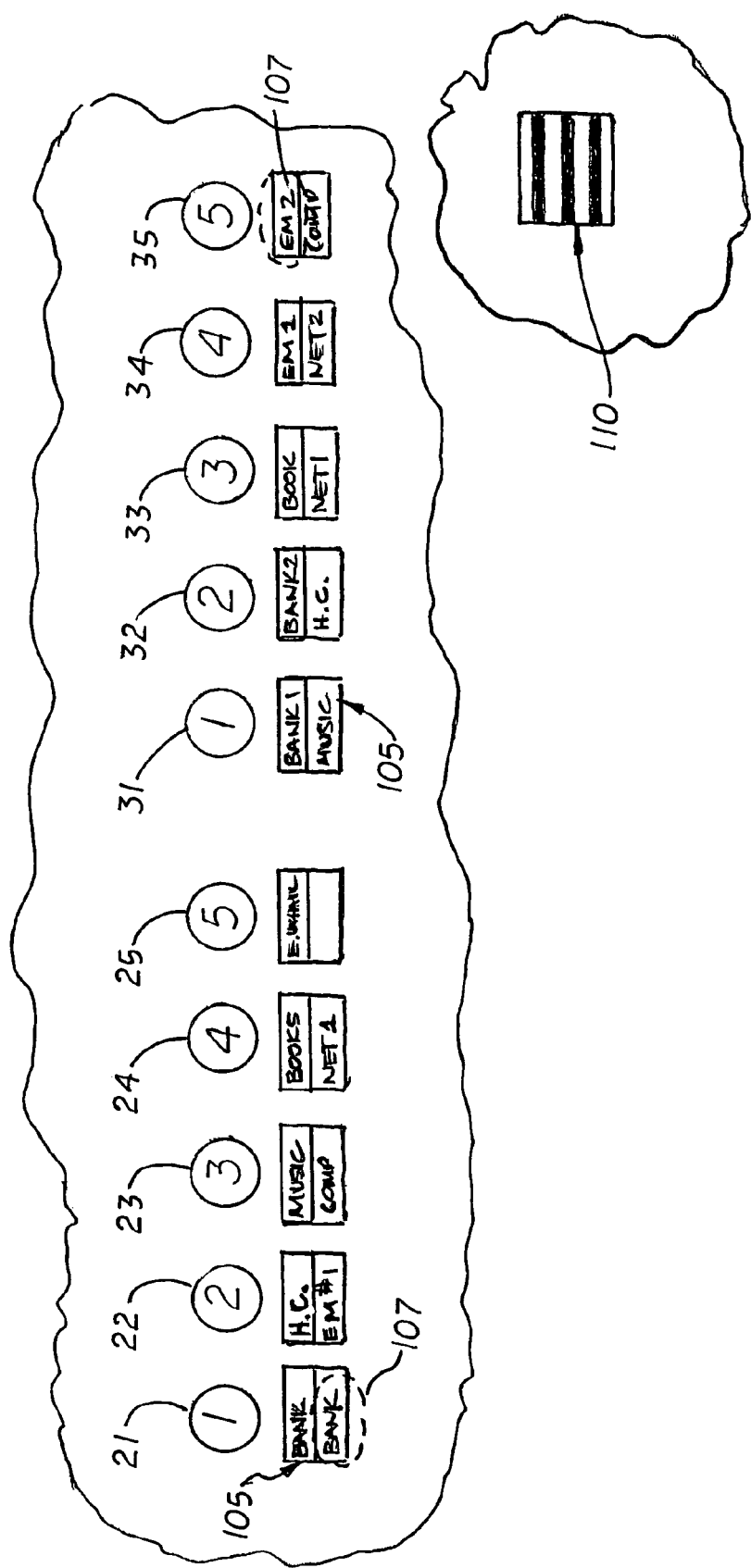
FIG. 2 is a top plan view of the computer keyboard shown in FIG. 1 with a plurality of username keys and the plurality of password keys more clearly shown.

As shown in FIG. 2, located below the keys 21-25 and 31-35 are labels 105 with indicia 107 printed on them that corresponds to the information in the menu table 80 shown in FIG. 4. Preferably, the keyboard 20 includes an authorization feature, such as a finger print reader 110, a key fob, or a Blue Tooth linked device, that is used as a security device which determines if the user is an authorized user of the keyboard 20. If the keyboard user is not an authorized user, then the username keys 21-25 and the password keys 31-35 may inactivate. Also, access to the Recording Page 40 and Menu table 80 is blocked.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A multiple username and password recording keyboard system, comprising:
   a. a keyboard with a plurality of programmable username keys and a plurality of programmable password keys located thereon, each said username key and said password key being on said keyboard assigned to an alpha/numeric code element in a recording page corresponding to a username and a password selected by an authorized user; and,
   b. a software program which when loaded into a computer linked to said keyboard, said software program presents username and password menu page that presents a plurality of username entry boxes and a plurality of password entry boxes, each said username entry box being associated with at least one username key on said keyboard and each said password key being associated with at least one password key on said keyboard as available in said recording page, wherein said menu page allows a user to create a list of different protected resources for an authorized user.

2. The recording keyboard system, as recited in claim 1, wherein said software program also presents a protected asset menu table that lists at least one protected asset, the alpha/numeric code element assigned to the username needed to access, open or use the protected asset, and the alpha/numeric code element assigned to the password needed to access, open or use the protected asset.

3. The recording keyboard system, as recited in claim 2, wherein said keyboard is protected by a security system that prevents the unauthorized use of said keyboard.

4. The recording keyboard system, as recited in claim 3, wherein said security system is a finger print reader that identifies the finger prints of an authorized user.

5. The recording keyboard system, as recited in claim 3, wherein said security system is a key fob that interfaces with said computer or said keyboard that identifies the individual that connects the key fob as an authorized user of said computer or said keyboard.

6. A method for recording and inputting a plurality of usernames and passwords into a computer, comprising the following steps:
   a. selecting a username and password recording keyboard system that includes a keyboard with a plurality of programmable username keys and a plurality of programmable password keys located thereon, said system also includes a software program which when loaded into a computer linked to said keyboard, said software program presents a menu table that includes a list of username boxes and password boxes in which the user inputs a desired username and password, respectively, each said username box being associated with one said username key on said keyboard and password box being associated with one said password key on said keyboard as available in a recording page, wherein said menu page lists one or more different protected resources for an authorized user;
   b. selecting a computer with a display and a keyboard with programmable username keys and programmable password keys on said keyboard, said username keys and password keys each being assigned to an alpha/numeric code element used by said program in said recording page corresponding to a username and a password selected by an authorized user;
   c. loading the software program into said computer;
   d. entering a username and a password into the username and password boxes, respectively, on said username and password recording page;
   e. selecting an asset menu protected page that may be accessed, used, or open only by inputting one combination of a username and password entered into said menu table; and,
   f. pressing the username and password key on said keyboard assigned to the necessary username and password needed to access, use, or open said asset.

* * * * *